Fig. 1.

INVENTOR.
John L. Nagely.

INVENTOR.
John L. Nagely,

Patented July 20, 1954

2,683,965

UNITED STATES PATENT OFFICE 2,683,965

APPARATUS FOR CONTROLLING THE FLOW OF FUEL TO TURBOJET ENGINES

John L. Nagely, Toledo, Ohio, assignor to Packard Motor Car Company, Detroit, Mich., a corporation of Michigan Application August 28, 1947, Serial No. 771,092

29 Claims. (Cl. 60—39.28)

The invention relates generally to apparatus and a method of metering and controlling the flow of fuel to engines and more particularly to such apparatus and method for use with turbojet engines.

The general object of the invention is to provide a novel apparatus and method of the foregoing character, which provides for full power modulation for a wide range of engine speeds.

Another object is to provide a novel apparatus and method of the foregoing character, which provides for manual control for starting and for control up to a predetermined speed, with automatic governor control at any desired speed above such predetermined speed.

A further object is to provide a novel apparatus and method of the foregoing character, arranged so that the speed to which the automatic governor holds the engine may be varied at will, with a manual override for use in case of failure of the governor.

Still another object is to provide a novel apparatus and method of the foregoing character, by which the rate of acceleration is limited to prevent occurrence of excessive engine temperatures.

It is also an object to provide a novel apparatus and method of the foregoing character, which, when used in aircraft, provides a uniform degree of sensitivity independent of altitude.

A still further object is to provide apparatus having the foregoing characteristics, which is particularly adapted for aircraft use and may be mounted either on the engine or on the structure of the aircraft aside from the engine.

Other objects and advantages will become apparent from the following description taken in connection with the accompanying drawings, in which.

The apparatus shown herein, as heretofore mentioned, is adapted for supplying fuel to the combustion chamber or chambers of a turbo-jet engine of a character employed in aircraft. Fundamentally, the apparatus comprises a fuel pump and a metering valve by which the flow of fuel from the pump to the combustion chamber is regulated. The pump is adapted to be driven by the engine so that its output varies in accordance with the speed of the engine, and the metering valve is adapted to be adjusted to meet varying operating conditions of the engine.

After the engine is started and brought up to idling speed, it is desirable that adjustment of the metering valve be subjected to a governor control which may be set for any desired engine speed. While various types of governors might be employed, the type shown herein and found to be satisfactory and sufficiently sensitive utilizes electronic devices controlled by voltage derived from a tachometer driven by the engine. The governor may be manually set for any desired engine speed between idling speed and the maximum speed and will accurately maintain such speed at varying altitudes because certain other features are incorporated in the apparatus.

For starting the engine and bringing it up to idle speed, a manual control of the metering valve is provided. However, when the manual control is moved to the idle-speed position, the governor may thereupon assume control and bring the engine up to and maintain it at any desired speed above the idle speed. For emergency operation, however, the manual control may be utilized for speeds above idle speed, in case flying conditions are such that manual operation is preferable or in case there is a failure of the governor.

The fuel supply means, that is, the pump and metering valve, is preferably constructed as a unit adapted to receive fuel from a source in which the fuel is placed under pressure before entering the pump. The pump forces the fuel through the metering valve and the fuel is then conducted to the combustion chamber or chambers of the engine. The pressure differential across the metering valve, of course, determines the rate of flow therethrough for any given adjustment of the metering valve. The metering valve itself is adjusted, as mentioned above, either by the electronic governor or by the manual control, a reversible motor being provided in the present instance for adjusting the valve with the motor controlled by the electronic governor.

The pump employed in the present instance is of the positive displacement type and since its output varies with the speed of the engine, provision is made in the unit for varying the pressure differential applied to the metering valve with the altitude so as to provide approximately the same degree of sensitivity of control independent of altitude. In this connection, it will be noted that the pressure rise through the compressor of the engine increases with speed and for any given speed decreases with altitude. Since the fuel flow requirement follows these two characteristics, the pressure differential applied to the metering valve may be made a function of the pressure rise through the compressor of the engine. To this end, the pressure differential applied to the metering valve is varied by by-passing a portion of the fuel from the delivery side of the pump back to the source of the fuel, through a by-pass valve which is shiftable in response to the pressure rise through the compressor of the engine.

The fuel supply means also permits fuel to flow direct from the source to the metering valve, should the fuel pump become disabled. While such flow might be provided through a means separate from the first-mentioned by-pass and valve, it is preferred to utilize the same by-pass passage and valve for the two functions. Thus, the by-pass valve is arranged to open as a result of movement in opposite directions. When opened in one direction, it by-passes fuel from the delivery side of the fuel pump back to the source to control the pressure differential applied to the metering valve, and when opened in the opposite direction, it permits flow through the by-pass passage direct from the source of fuel to the metering valve. In both instances, the by-pass valve is shifted as a result of certain pressures so that the valve is opened automatically when conditions demand it.

The apparatus may also include pressure-sensitive means adapted to function, when fuel is caused to be delivered direct from the source to the metering valve, to increase the pressure of the fuel at the source by rendering additional pumping means operable. Such additional pumping means may comprise a separate auxiliary pump but, in the preferred form, the means for supplying fuel from the source under pressure is a two-stage booster pump with only one stage thereof operating normally when the main fuel pump is operating. When the pressure-sensitive means calls for additional pressure at the source, then the second stage of the booster pump is rendered operable.

Under certain conditions, the governor may call for a rate of acceleration demanding such a supply of fuel to the combustion chamber that excessive temperatures in the engine might occur, thus damaging the engine. To prevent this, a temperature limiting device responsive to a critical engine temperature may be included in the fuel supply unit to limit the rate of flow of fuel to the engine. Such temperature limiting device in the present instance is mounted to open the by-pass valve from the delivery side of the fuel pump to the source to permit flow therethrough, thereby reducing the pressure differential applied to the metering valve and consequently decreasing the flow below that called for by the governor. In effect, this arrangement will provide constant temperature acceleration, and the maximum acceleration for the combustion and temperature characteristics of the engine may be attained.

Figure 1:
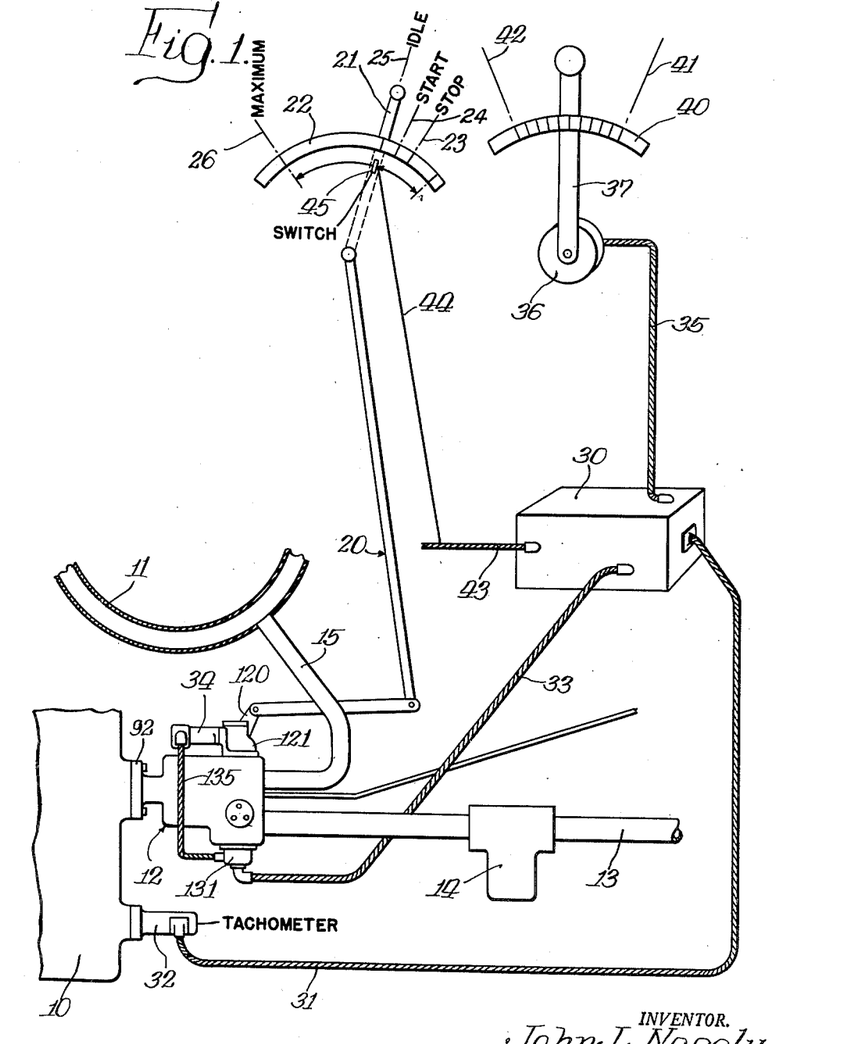
Figure 1 is a diagrammatic view of a fuel supply apparatus for a turbo-jet engine, embodying the features of the invention.

In Fig. 1 of the drawings, I have shown diagrammatically substantially the complete apparatus and particularly disclose the manual and governor control of the metering valve. In this figure, a portion of the engine is indicated at 10 and a manifold for distributing fuel to the various burners in the combustion chamber or chambers of the engine is shown at 11. The main fuel pump together with the metering valve and the by-pass passage is herein shown as a unit 12. Such unit may be mounted either on the engine or on the structure of the aircraft aside from the engine. In the present instance, it is illustrated as being mounted on the portion 10 of the engine so that the pump may have a driving connection with the engine. Fuel is adapted to be supplied to the pump within the unit 12 from a source of fuel under pressure (not shown) by means of a pipe 13 preferably provided with a filter 14. The metered fuel is adapted to be conducted from the unit 12 to the fuel nozzle manifold 11 by a pipe 15.

As heretofore mentioned, the metering valve for controlling the flow of fuel from the main pump to the nozzle manifold 11 and included in the unit 12 is adapted to be controlled both manually and by governor means. In the present instance, the manual control is shown as comprising a system of levers and links, indicated generally at 20 and including a manually movable element 21. For purposes of illustration, the manually movable element 21 is shown as a hand lever cooperating with a fixed sector 22, but, of course, any other convenient form of similar device may be used. The hand lever 21 is adapted to be moved from a stop position in which the metering valve is closed and no fuel can flow to the manifold 11, through a start position and an idle-speed position, and then through the entire range of speeds to the maximum engine speed. In Fig. 1, the stop position of the lever 21 is indicated at 23, the start position at 24, the idle-speed position at 25, and the maximum speed position at 26.

The governor, as heretofore mentioned, is of the electronic type and is diagrammatically shown at 30 with an electrical connection 31 extending to a tachometer 32 mounted on the engine and driven thereby, so that the governor 30 functions in response to engine speeds. The governor 30 is electrically connected as by a cable 33 to a means for operating the metering valve in the unit 12. In the present instance, such means comprises a reversible motor 34.

The invention, of course, is not limited to the particular type of governor shown herein and any other suitable type may be substituted for the electronic type illustrated. Moreover, the detailed construction of the governor 30 constitutes no part of the invention and is, therefore, not disclosed in detail. The metering valve adjusting means may also be actuated by means other than a reversible motor 34, such motor being shown in the drawings merely as a means which may be readily controlled by a governor of the electronic type.

The governor 30 is adjustable to maintain any desired engine speed between idle speed and maximum engine speed. For this reason, the governor 30 is shown as connected by a cable 35 to a control means 36 including, for purposes of illustration, a hand lever 37 cooperating with an indicator sector 40 on which the idle-speed position is shown at 41 and the maximum-speed position at 42. The hand lever 37 of the control means 36 thus may be shifted to any desired position between such idle-speed position and the maximum-speed position 42 to cause the governor to maintain the engine speed for which the hand lever 37 is set.

Current for operation of the governor 30 is supplied thereto through a cable 43 adapted to be connected to a power source constituting one of the accessories utilized with the engine. The governor 30 is inoperable during operation of the engine up to its idle speed and is adapted to be rendered operable when the engine reaches such speed. To this end, the circuit from the power source to the governor 30, which includes the cable 43, also includes a connection 44 leading to a switch 45 carried preferably by the manual control lever 21 and adapted to be actuated by movement of the manual control level 21 to its idle-speed position 25. Thus, during the starting cycle of the engine, the metering valve for controlling the flow of fuel to the engine is entirely under the control of the operator by the manual control lever 21. When the manual control lever 21 is moved to the idle-speed position 25, the switch 45 is adapted to be closed by such movement and the governor 30 thereby being rendered operable. The governor 30 thereupon takes over control of the metering valve in the unit 12 and the speed of the engine will be regulated in accordance with the setting of the hand lever 37 of the governor control 36. In normal operation, therefore, manual control is utilized to bring the engine up to idling speed and the governor 30 takes over the control for speeds between idling speed and maximum speed. During the period of governor control, the hand lever 21 of the manual control remains at its idle-speed position 25.

In the event of the failure of the governor or tachometer or any part of the automatic control system, emergency operation of the metering valve may be obtained by the manual control. Thus, to exercise manual control between idle speed and maximum speed, the hand control lever 21 may be moved beyond its idle-speed position 25 to open the switch 45 and thus render the governor 30 inoperable. The manual control may then be utilized to adjust the metering valve by movement of the hand lever 21 to any desired point between the idle-speed position 25 and the maximum-speed position 26. There may also arise certain conditions where it is more desirable to control the engine manually, within its normal operating range, rather than by the governor, even though the governor or any of its related parts has not suffered any failure. The present structure thus provides for such manual control merely by movement of the hand lever 21 beyond its idle-speed position 25.

Figure 2:
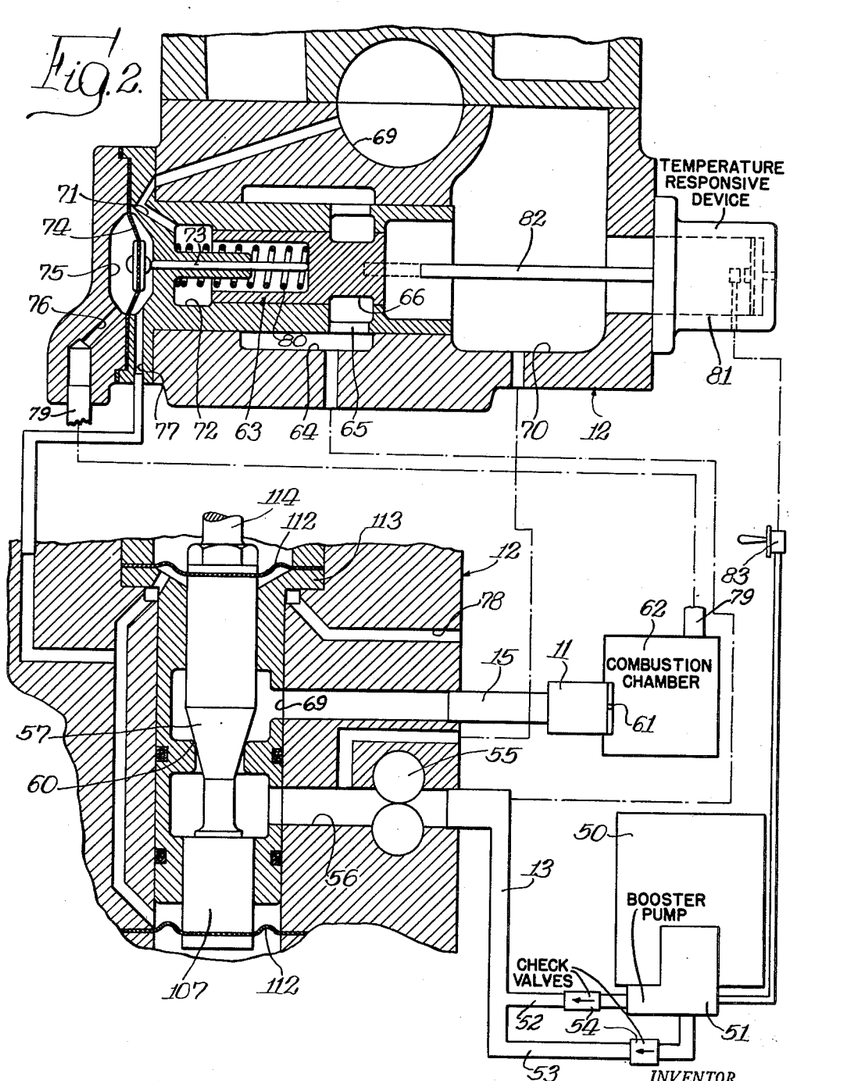
Fig. 2 is a diagrammatic view of a portion of Fig. 1 and showing the means for controlling the flow of fuel to the engine.
Figure 3:
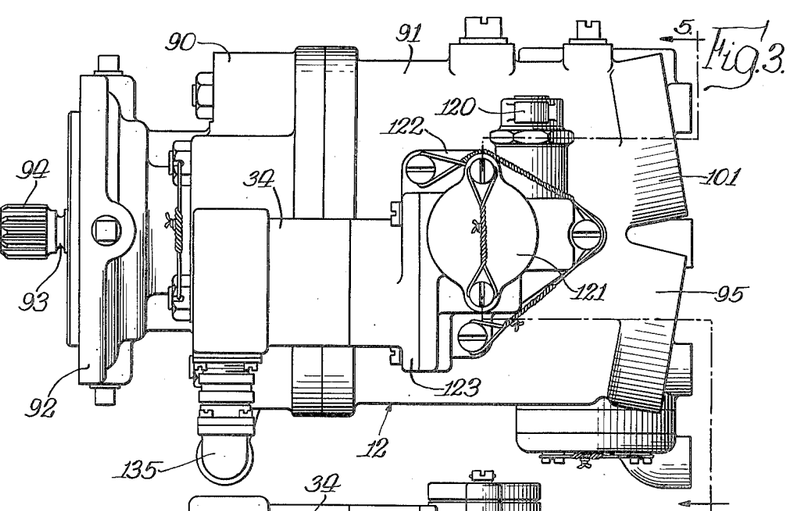
Fig. 3 is a plan view of the structure shown diagrammatically in Fig. 2.
Figure 4:
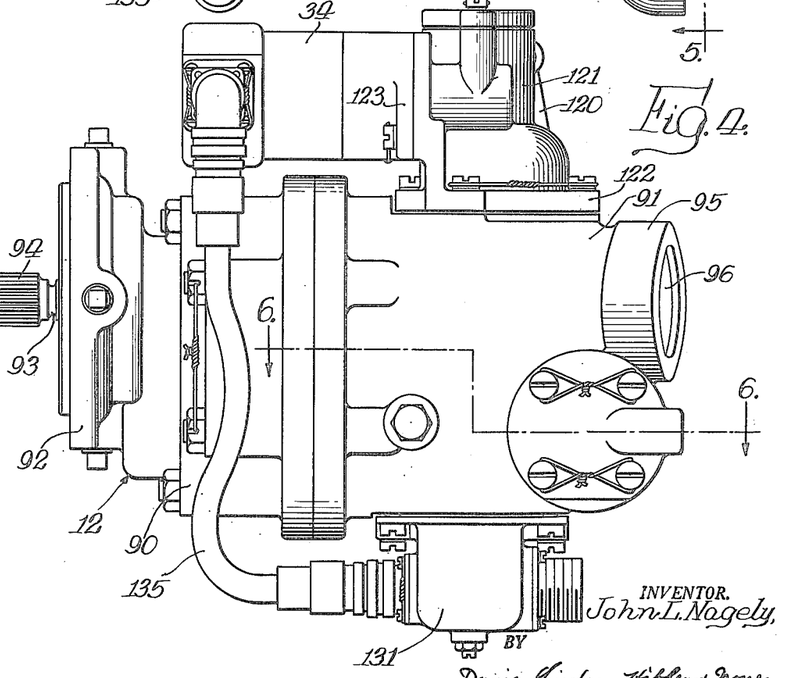
Fig. 4 is a side elevational view of the structure shown diagrammatically in Fig. 2.

The unit 12, which includes the main fuel pump, the metering valve and the by-pass valve, is shown in its preferred form in Figs. 3, 4, 5 and 6, while the flow of fuel through the unit 12 from the source to the combustion chamber or chambers of the engine is shown diagrammatically in Fig. 2. The mode of operation of the apparatus and the function of the various parts can best be disclosed by first describing the apparatus by means of the diagrammatic disclosure of Fig. 2. In this figure, the source of fuel is indicated as a fuel tank 50, from which fuel is withdrawn and placed under pressure by means of a booster pump 51. The booster pump 51 is preferably of the two-stage type, for reasons more fully explained hereinafter, so that fuel is withdrawn from the tank and discharged into the pipe 13 through two passages 52 and 53 connected to the respective stages of the pump 51. Check valves 54 are preferably included in the discharge passages 52 and 53. The fuel thus supplied under pressure to the supply pipe 13 is conducted to the main fuel pump, indicated at 55 and included in the unit 12. From the main fuel pump 55, fuel is discharged through a passage 56 to the metering valve indicated at 57. The metering valve 57 is preferably in the form of a needle valve cooperating with a seat 60 and controlling the flow of fuel from the main pump 55 to the pipe 15 conducting the fuel to the nozzle manifold 11. In Fig. 2, the nozzle manifold 11 is shown as discharging the fuel through a nozzle 61 into the combustion chamber of the engine, indicated at 62. The metering valve 57, as heretofore mentioned, is adapted to be adjusted either by the manual control or the governor control described in connection with Fig. 1 of the drawings.

As heretofore mentioned, the pressure differential at the metering valve determines the rate of flow of fuel therethrough for any given adjustment of the valve. Since the rate of flow of fuel required to attain a given speed at varying altitudes will vary, the pressure differential to attain such varying rate of flow must be co-ordinated with conditions resulting from differences in altitude. By varying such pressure differential with the altitude, approximately the same degree of sensitivity of control by the governor may be obtained for all altitudes. To attain the desired variation in pressure differential applied to the metering valve, the pressure rise through the compressor of the engine is utilized to control such pressure differential, since such pressure rise increases with engine speed and for any given speed decreases with altitude, and the fuel flow requirement follows these two characteristics. To obtain such variation in the pressure differential applied to the metering valve, the pump 55 is preferably of the positive displacement type so that its output varies with the speed of the engine, and a by-pass passage connecting the delivery side of the pump with the source of the fuel and controlled by a by-pass valve is provided, the by-pass valve being shiftable in response to the pressure rise through the compressor of the engine.

In the diagrammatic view of Fig. 2 of the drawings, the by-pass valve is indicated at 63 to control the flow of fuel from the delivery passage 56 of the pump 55 to the intake side of the pump 55. Within the unit 12 adjacent the by-pass valve 63 is a chamber 64 connected, by passages formed within the housing casting of the unit 12, to the supply pipe 13, the chamber 64 being connected by radial holes 65 to an annular passage 66 in the by-pass valve 63. Such housing also includes a chamber 70 connected, by cored passages in the housing, to the delivery side of the pump 55, that is, to the passage 56. The annular passage 66 in the by-pass valve 63 is arranged so that the intake pressure of the fuel exerts equal and opposite forces on the by-pass valve 63 and, therefore, is balanced and is ineffective in causing any movement of the by-pass valve 63. The pressure from the delivery side of the pump 55 present in the chamber 70, however, exerts a force on the right-hand end of the by-pass valve 63, as illustrated in Fig. 2, tending to move the by-pass valve to the left. Any movement of the by-pass valve to the left as shown in that figure, of course, would permit flow from the chamber 70 to the chamber 64, or, in other words, from the delivery side of the pump 55 back to the intake side of the pump.

In order to partially counterbalance the pressure of the delivery side of the pump 55 on the by-pass valve 63, the other end thereof, that is, the left end as shown in Fig. 2, is subjected to the pressure on the discharge side of the metering valve 57, which is the pressure in the pipe 15. To this end, passages indicated at 71 are provided in the housing to supply fuel to a chamber 72 at the left end of the valve 63 from the discharge side of the metering valve 57 as indicated at 69 in Fig. 2. The chamber 72 is arranged so that the pressure of the fuel therein is applied to the full area of the end of the valve 63 so that the areas at both ends of the valve to which the respective pressures on the delivery side of the pump 55 and the discharge side of the metering valve 57 are applied are equal. The by-pass valve 63 is thus subjected to the same pressure differential that is applied to the metering valve 57.

As heretofore mentioned, the by-pass valve 63 is also controlled by the pressure rise through the compressor of the engine. To this end, an actuating rod or pin 73 is slidably mounted to bear against the left end of the metering valve 63, and the rod 73 is adapted to be actuated in accordance with the pressure rise through the compressor. In the present instance, the actuator for the rod 73 comprises a diaphragm 74 mounted in a diaphragm chamber 75. The outer side of the diaphragm chamber 75 is adapted to be connected by means of a passage 76 and a connection 79 to the combustion chamber of the engine, so that the outer face of the diaphragm 74 is subjected to the discharge pressure of the compressor. The inner portion of the chamber 75 is adapted to be connected to the ambient air by means of a passage 77 in the housing. In the present instance, the passage 77 is connected to certain passages adjacent the metering valve 57 which are in turn open to the ambient air by means of a passage 78.

The diaphragm 74 is thus subjected on its outer face to the discharge pressure of the compressor and on its inner face to the pressure of the ambient air. Consequently, the force exerted by the diaphragm 74 on the actuator pin 73 is proportional to the pressure rise through the compressor, and the by-pass valve 63 is thus adapted to be moved toward the right against the pressure on the delivery side of the pump 55, by the resultant force applied to the diaphragm 74. In the preferred form, the force exerted on the by-pass valve 63 by the actuator rod 73 is supplemented by a spring 80 mounted in the chamber 72.

From the foregoing, it is apparent that the force exerted by pressure on the delivery side of pump 55 tends to move the by-pass valve 63 to the left, while the pressure on the discharge side of the metering valve 57, the force of the spring, and the force exerted through the actuator rod 73 due to the pressure rise through the compressor, all tend to move the by-pass valve 63 to the right. Restating the foregoing, it may be said that the pressure differential applied to the metering valve acts in one direction on the by-pass valve 63 tending to open it, while the pressure rise through the compressor plus the force of the spring tends to hold the by-pass valve 63 closed. The pressure on the delivery side of the pump 55, of course, is higher under normal operation than the pressure on the discharge side of the metering valve 57, so that there is a positive differential applied to the metering valve as well as to the by-pass valve. Furthermore, such pressures and the resultant differential are substantially greater than the net force exerted by the spring and the effect of the pressure rise through the compressor on the by-pass valve. Consequently, the metering valve will be moved to the left to permit flow of a portion of the fuel delivered by the pump 55 back to the intake side thereof, and the pressure on the delivery side of the pump 55 will thereby be decreased. As a result, the pressure differential applied to the metering valve is a function of the pressure rise through the compressor and the flow through the metering valve will vary with such pressure rise.

As heretofore mentioned, the rate of acceleration demanded by the governor might on occasion produce a flow of fuel which would result in excessive temperatures in the engine, causing damage thereto. The present apparatus is provided with means to prevent such excessive flow. To this end, a temperature-responsive device 81 may be mounted on the housing 12, the device being responsive to critical engine temperatures. The device 81 may include a shiftable element 82 adapted to be moved into engagement with the by-pass valve 63, as indicated by dotted lines in Fig. 2, when critical engine temperatures are reached, and to force the valve 63 to the left to permit flow from the chamber 70 to the chamber 64. Thus, fuel will be by-passed from the delivery side of the pump back to the intake side thereof and the pressure differential applied to the metering valve 57 will be reduced to reduce the flow to the combustion chamber of the engine, thereby reducing temperatures occurring within the engine.

The present apparatus also includes means for supplying fuel direct from the source to the metering valve 57, should there be an excessive drop in pressure on the delivery side of the pump 55 as in the case of failure of such pump. Under such a condition, the pressure in the chamber 70, which is connected to the delivery side of the pump 55, would fall, and the pressure rise through the compressor of the engine, acting through the actuator pin 73 on the by-pass valve 63, as well as the force exerted by the spring 80, would tend to shift the by-pass valve 63 to the right to permit flow from the chamber 64 directly into the chamber 70. The chamber 64 being connected to the intake side of the pump 55, that is, to the source of fuel under pressure, and the chamber 70 being connected to the metering valve 57, fuel may flow under such conditions directly from the source to the metering valve, by-passing the pump 55. While this function is performed by the by-pass valve 63 in addition to the function of this valve in controlling the pressure differential applied to the metering valve 57, separate by-passes may, of course, be provided for the respective functions, if desired, with valves in each passage operable under the conditions stated. In the present structure, when the by-pass valve 63 is moved to the right, as mentioned, the element 82 of the temperature-responsive device 81 may serve as a stop for the valve 63, the position of the element 82 under such conditions being indicated in full lines in Fig. 2 of the drawings.

When the by-pass valve 63 is opened to permit flow direct from the source to the metering valve 57, it is desirable to increase the pressure of the fuel from the source. Such increase in pressure may, of course, be obtained by a separate pump, but preferably the second stage of the booster pump 51 is utilized for this purpose. The control for the second stage of the booster pump is indicated in Fig. 2 at 83 and may be manually operated. Preferably, however, it is subjected to automatic control through a pressure-responsive device responsive to an excessive drop in pressure in the chamber 70 which is connected, as heretofore mentioned, to the discharge side of the pump 55. In the preferred form, the pressure-responsive device may be incorporated in the device 81 since the latter is directly connected to the chamber 70 with the pressure-responsive portion of the device 81 connected to the control device 83 for the second stage of the booster pump 51. The pressure and temperature responsive means incorporated in device 81 may be similar to any of the bellows type servo means shown in the patent to Reggio 2,435,902 February 10, 1948.

In the preferred embodiment of the unit 12 shown in Figs. 3 to 6, the housing thereof is shown as comprising a pump section 90 and a valve section 91. The pump section 90 houses the pump 55 and is provided with a mounting plate 92 adapted to be mounted on the engine 10 to support the unit from the engine. The pump is adapted to be driven by the engine and, to this end, a shaft connection 93 extends beyond the mounting plate 92 and is shown as provided with a pinion 94 for engagement with a driving gear (not shown) within the engine. The details of the pump structure are not shown since they form no part of the invention. The pipe 13 connected to the source of fuel is adapted to be secured to the valve section 91 by a flange 95 formed on the section 91 and providing an intake passage 96 therein. The fuel discharged from the metering valve 57 through the pipe 15 is adapted to flow through a discharge passage 100 provided in the valve section 91, the latter having a flange 101 for connection with the pipe 15.

The valve section 91 houses the metering valve 57 as well as the by-pass valve 63. In the preferred construction, both of these valves together with their valve bodies, are in the form of sub-assemblies which are detachably mounted in the housing so as to be removable as a unit therefrom. The by-pass valve assembly includes in its unit structure the means providing the diaphragm chamber 75 and the diaphragm 74, while the metering valve assembly includes, in addition to the metering valve itself, the adjusting means connected to the manual control 20, as well as the governor control motor 34 and the drive connection therefrom with the metering valve.

Figure 5:
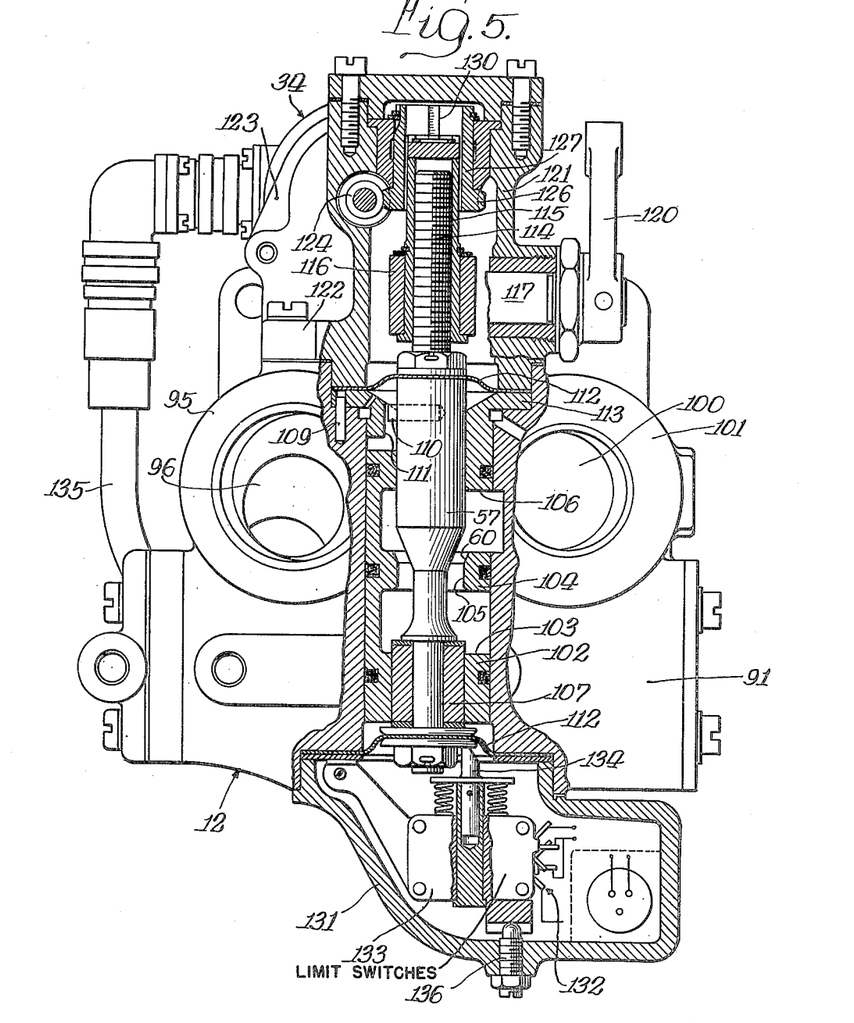
Fig. 5 is a vertical sectional view taken on the line 5—5 of Fig. 3.

The structure of the metering valve unit is particularly disclosed in Fig. 5. Thus, this unit comprises a valve body 102 mounted in the valve section 91 of the housing with appropriate pressure seals to prevent leakage of fuel between the valve body 102 and the housing. The valve body 102 is cylindrical in form and is provided with a chamber 103 connected to the delivery side of the pump 55. Within the valve body 102 is a transverse wall 104 provided with an opening 105 having a tapered portion constituting the seat 60 for the valve 57. The opening 105 extends into a chamber 106 in the valve body 102, which is in turn connected to the discharge passage 100 of the housing. Thus, fuel will flow from the pump 55 into the chamber 103 in the valve body, thence past the valve 57 into the chamber 106 and into the discharge passage 100.

The valve 57 is of elongated form slidably mounted adjacent its upper end in the valve body and carrying a spool 107 at its lower end, also slidably mounted in the valve body. Adjacent the upper end of the valve 57 is a radially extending pin 110 adapted to enter an axially extending slot 111 in the valve body 102 to prevent the valve 57 from rotating relative to the valve body. At each end of the valve 57 diaphragms 112 are located to seal off the space at the ends of the valve body from other portions within the housing, such spaces, in the present instance, being open to the ambient air so that no pressures can be built up therein. The upper end of the valve body 102 is provided with a flange 113 seated in a cavity in the housing and held against rotation by a pin 109. Thus, both the valve body 102 and the valve 57 are held against rotation, although the valve 57 may, of course, be shifted axially within the valve body.

The upper end of the valve member 57 is provided with a stem 114 extending beyond the valve section 91 of the housing for connection with the manual control and for operation by the reversible motor 34. To this end, the stem 114 is threaded in a nut 115, and secured to the lower end of the nut is a sleeve 116. The latter is arranged to permit rotation of the nut 115 within the sleeve but is held against endwise movement relative thereto. The sleeve is arranged for connection to the manual control and, to this end, is provided with a rack (not shown) extending longitudinally of the sleeve and meshing with a pinion (not shown) carried on a transversely mounted stub shaft 117. On the outer end of the stub shaft 117 is a lever 120 to which the manual control 20 (see Fig. 1) is connected. The stem 114 and the nut 115 are enclosed within a casing structure 121 which provides a journal at its side for the stub shaft 117, as clearly shown in Fig. 5. The casing 121 is provided with a flange portion 122 at its lower end adapted to be seated on and secured to the valve section 91 of the housing, the flange 113 on the end of the valve body 102 being secured in place when the casing 121 is secured to the housing.

From the foregoing, it will be apparent that rocking movement of the stub shaft 117 by the manual control 20, through the rack and pinion connection of the stub shaft 117 with the sleeve 116, causes the valve 57 to be shifted longitudinally. Thus, manual adjustment of the valve 47 may thereby be exercised. For adjustment of the valve 57 by means of the motor 34 under the control of the governor 30, the casing of the motor 34 is adapted to be secured to the casing 121 by means of a flange connection 123. The shaft of the motor 34 carries a worm 124 on one end thereof, the worm being located within the casing 121 (see Fig. 5). The worm 124 meshes with a worm wheel 126 provided on the lower end of a sleeve 127 journaled in the upper end of the casing 121 but held against longitudinal movement relative thereto. The interior of the sleeve 127 is provided with a splined or other driving connection 130 with the exterior of the nut 115. Thus, operation of the motor 34 rotates the sleeve 127 and, through the splined connection 130, rotates the nut 115 to effect longitudinal movement of the stem 114 and the valve 57, the nut being held against axial movement by the sleeve 116. The motor 34 being reversible, therefore, is capable of adjusting the valve 47 toward and from the valve seat 60.

To protect the valve 57 against being moved too far in either direction, stop means cooperating with the motor 34 is provided. While mechanical means could be arranged for limiting the movement of the valve 57 in both directions, such means would place undue loads on the motor, and consequently the stop means shown herein is electrical in character to open the motor circuit when the valve 57 approaches its idle position on the one hand and the maximum-speed position on the other hand. In the present instance, such means comprises a casing 131 mounted on the lower end of the valve section 91 of the housing and enclosing limit switches, indicated generally at 132, by which the motor circuit may be opened, two limit switches being utilized and respectively operable at opposite limits of movement of the valve 57. Such switches, in the present instance, are carried by an adjustable bracket 133 mounted within the casing 131 and supporting movable members 134 adapted to be engaged by the lower end of the valve 57 to actuate the limit switches 132 at opposite limits of the travel of the valve. The bracket 133 is adapted to be adjusted to the proper position by means of a screw 136 threaded into the casing 131 and engaging the lower portion of the bracket. To the end that the limit switches 132 may be placed in the motor circuit, the cable 33 extending from the governor 30 is connected to the switches 132 within the casing 131 and a cable 135 extends from the casing 131 to the motor 34.

Figure 6:
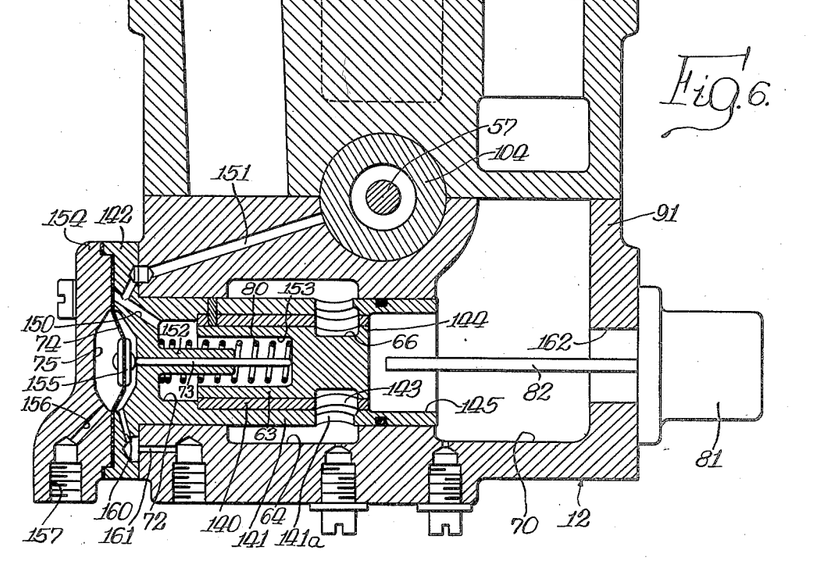
Fig. 6 is a horizontal sectional view taken on the line 6—6 of Fig. 4.

The by-pass valve 63 controlling the by-passing of fluid between the delivery and intake sides of the pump 55 is particularly shown in Fig. 6 of the drawings. As in the case of the metering valve assembly, the by-pass valve is in the form of a sub-assembly detachably mounted within the valve section 91 of the housing. To this end, the valve 63 is cylindrical in character and is slidably mounted in a bushing 140 fixedly mounted in a valve body 141 secured in the housing section 91. At its outer end, the valve body 141 is provided with a flange 142 engaging an outer face of the housing section 91 and positioning the valve body within such section. Within the housing and extending about a central portion of the valve body is the chamber 64 which is connected with the intake passage 96 through suitable coring in the housing casting. The valve body 141 is provided with a series of radial openings 141a aligned with similar openings 143 formed in the bushing 140 and connecting the chamber 64 with the annular groove 66 in the valve member 63. The groove 66 is located adjacent one end of the valve 63 and thus provides a flange 144 on the end of the valve 63. The adjacent end of the valve body 141 is open as at 145 to permit fluid from the chamber 70 in the housing section 91 to enter the end of the valve body 141. The chamber 70, as heretofore mentioned, is connected with the delivery side of the fuel pump 55 so that the adjacent end face of the valve 63 is subjected to the pressure of the fuel at the delivery side of the pump. It will be apparent from Fig. 6 that movement of the valve member 63 in either direction from the intermediate position shown will permit flow of fuel between the chamber 70 and the chamber 64.

The chamber 72 at the other end of the valve member 63 is adapted to be subjected to the fuel pressure after the fuel has passed the metering valve 47. To this end, the valve body 141 is provided with a slanting passage 150 connecting with a passage 151 in the housing section 91 and communicating with the chamber 106 in the valve body 102. The chamber 106, as described above, is on the discharge side of the metering valve 57. Consequently, the left-hand end of the valve 63, as shown in Fig. 6, will be subjected to the pressure of the fuel after it has passed through the metering valve. In the arrangement shown in Fig. 6, the areas subjected to pressure on the respective ends of the by-pass valve are the same. To subject the metering valve 63 to the action of the pressure rise through the compressor of the engine, the actuator rod 73 is shown as slidably mounted in the valve body 141 with a stem portion 152 being provided within the chamber 72 to provide adequate sliding support for the actuator rod 73. The rod 73 extends inwardly beyond the stem 152 and into a cavity 153 formed in the left end of the by-pass valve 63. Extending about the stem 152 and into cavity 153 is the spring 80, heretofore described.

The diaphragm chamber 75 in which the diaphragm 74 is mounted is, in the present instance, formed by registering depressions in the end of the valve body 141 and a cap 154 seated on the outer end of the valve body 141 and secured thereto. The diaphragm 74, at its outer periphery, is clamped between the cap 154 and the flange 142 on the valve body 141 and is provided, at its center, with a button 155 adapted to engage the actuator rod 73. The outer face of the diaphragm 74 is adapted to be subjected to the pressure of the air discharged by the compressor of the engine. To this end, a passage 156 is provided in the cap 154, leading from a hollow boss 157 adapted to be connected to the combustion chamber of the engine adjacent the discharge of the compressor. Thus, the pressure of the air discharged by the compressor will tend to force the diaphragm inwardly. The inner portion of the diaphragm chamber 75 is adapted to be connected to the ambient air by means of a passage 160 provided in the flange 142 of the valve body and communicating with a passage 161 in the housing section 91. The passage 161 is suitably connected with the air passages adjacent the metering valve 57, which in turn are open to the ambient air through the passage 78. The net pressure acting on the diaphragm 74 is thus equal to the pressure rise through the compressor of the engine, and such pressure rise together with the action of the spring 80 tends to shift the by-pass valve 63 and, therefore, controls the pressure differential applied to the metering valve 57.

Under normal operation, the pressure in the chamber 70 adjacent the right-hand end of the metering valve 63 is sufficient to overcome the opposing forces and shift the valve 63 to the left to permit flow of fuel from the discharge side of the pump, through the chamber 70, the chamber 64, and thence back to the intake passage 96 on the intake side of the pump 55. The combined temperature-responsive and pressure-responsive device 81 is shown on the right-hand side of the housing section 91, as illustrated in Fig. 6, and is open to the chamber 70 within the housing section by an aperture 162 in the wall of the housing section. The temperature-control element 82 extends inwardly through the aperture 162 and has its end positioned adjacent the end of the by-pass valve 63 so that, when critical temperatures in the engine are reached, the temperature-responsive element 82 engages the right end face of the by-pass valve 63 to shift it toward the left and thus permit flow of fuel from the chamber 70 into the chamber 64 and back to the intake side of the pump 55. Such by-passing of the fuel reduces the pressure differential applied to the metering valve 57 and, consequently, reduces the flow therethrough.

As heretofore mentioned, should the pump 55 become disabled so that the pressure on the delivery side thereof drops excessively, the pressure in the chamber 70 is consequently greatly reduced and the pressure rise through the compressor acting through the diaphragm 74, together with the spring 80, will shift the by-pass valve 63 to the right, permitting flow directly from the source of fuel, that is, from the intake passage 96 through the chamber 64 to the chamber 70. The chamber 70 being connected to the delivery side of the pump 55 will thus deliver fuel directly from the source to the metering valve 57.

Figure 7:
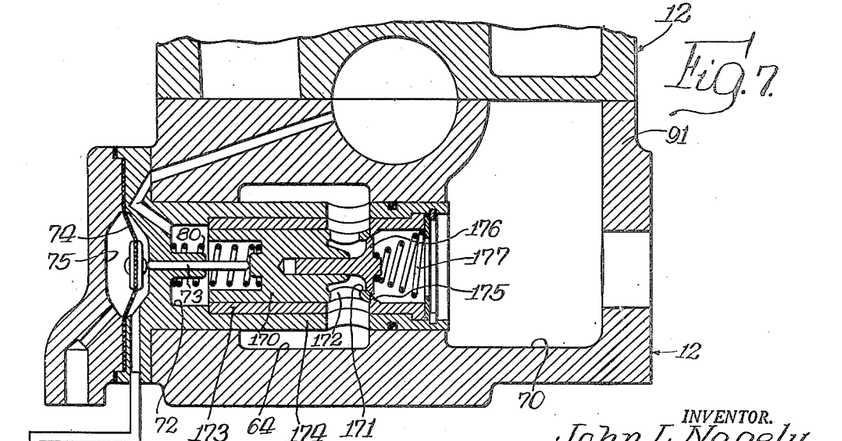
Fig. 7 is a fragmentary diagrammatic view similar to the upper portion of Fig. 2 but showing a modified form of construction.

In Fig. 7, I have shown diagrammatically a modified construction of the by-pass valve which attains substantially the same result as the by-pass valve shown in the previous figures, but does so in a slightly different manner. In this instance, the housing section 91 is provided with the chamber 64 connected to the intake passage 96 in the housing and thus is subjected to the fuel pressure at the intake side of the pump 55. The valve member in this instance is shown at 170 and, at its right-hand end, is provided with a pocket 171. Opening radially from the pocket 171 are a series of holes 172 registering with similar holes in a valve supporting bushing 173 and a valve body 174 to provide communication from the chamber 64 into the pocket 171. The end of the valve 170 is adapted to abut against an inwardly directed flange 175 formed within the bushing 173 to prevent flow between the end of the valve member 170 and the bushing. Slidably mounted within the end of the valve member 170 is an auxiliary valve 176 urged by a spring 177 against a seat formed at the end of the pocket 171. The spring thus tends to maintain the auxiliary valve 176 closed. The housing section 91 is provided with the chamber 70 connected to the delivery side of the pump 55 and subjected to the pressure of the fuel therefrom, so that such pressure tends to urge the valve 170 to the left, as shown in this figure. The left end of the valve 170 is subjected to the pressure of the fuel discharged by the metering valve, as in the case of the other form, and is similarly subjected to the action of a spring and the pressure rise through the compressor of the engine. The pressure of the fuel in the chamber 70 from the delivery side of the pump 55 is adapted to force the by-pass valve 170 to the left to an extent dependent upon the pressure on the discharge side of the metering valve 57 and the pressure rise through the compressor, to by-pass fuel from the chamber 70 into the chamber 64, which in turn is connected to the intake passage 96.

As thus far described, the by-pass valve 170 shown in Fig. 7 functions similarly to the by-pass valve 63 shown in the other figures of the drawings. For its other function, namely, by-passing fuel around the pump from the source directly to the metering valve, in case of failure of the pump, the valve 170 functions in a somewhat different manner. In this instance, failure of the pump 55 results in an excessive drop in pressure in the chamber 70, so that the pressure in the chamber 64, which is that of the fuel in the intake passage 96 coming from the source, is sufficient to force the auxiliary valve 176 to the right relative to the valve 170 and permit fuel to flow from the chamber 64 through the radial openings 172, the pocket 171, and past the seat for the valve 176 into the chamber 70. The chamber 70 being connected to the delivery side of the pump 55, thus can supply fuel direct from the intake passage 96 to the metering valve 57.

With the apparatus hereinbefore described, full power of modulation for a wide range of engine speeds may be attained. The apparatus provides for manual control of the supply of the fuel to the engine for starting and for bringing the engine up to idle speed. For speeds above idle speed, the engine may be subjected to automatic governor control at any desired speed, or, if conditions warrant or if the governor should become disabled, the manual control may be exercised for any engine speed above the idle speed. The apparatus provides for a uniform degree of sensitivity of control independent of altitude, and further limits the rate of acceleration to such extent that excessive engine temperatures will not be encountered.

I claim:

1. A fuel supply apparatus for a turbo-jet engine, comprising engine-driven means for pumping fuel under pressure, a duct for supplying said fuel to the engine, a valve for controlling the flow of fuel from said pumping means to said duct, power-operated means for adjusting said valve, an engine-driven tachometer, an adjustable governor responsive to the speed indication of said tachometer for controlling said power-operated means and including an electrical control circuit adapted when closed to render the governor operable and when open to render the governor inoperable, and a manually adjustable control for adjusting said valve independently of said power operated means and including a switch for opening and closing said electrical control circuit, said switch being actuated by movement of said control to close said circuit only when said control is adjusted to a predetermined point whereupon said governor is rendered operable.

2. In a fuel supply apparatus for a turbo-jet engine, a fuel control valve, a manually adjustable governor including an electrical circuit adapted when closed to render the governor operable, a governor-controlled actuator for adjusting said valve, a manual control for adjusting said valve and adjustable through a range from a stop position to a maximum engine speed position including an idling speed position, and a switch in said electrical circuit for rendering said governor operable and closable by movement of said manual control to its idling speed position.

3. In a fuel supply apparatus for a turbo-jet engine, a fuel control valve, a manual control for adjusting said valve through a range from a stop position through an idling speed position to a maximum speed position, an actuator for adjusting said valve through a range from the idling speed position to the maximum speed position, a manually adjustable governor for controlling said actuator, and a control device for rendering said governor operable and actuated by said manual control on movement of the latter to idling speed position.

4. In a fuel supply apparatus for a turbo-jet engine, a fuel control valve, mechanical means for adjusting said valve through a range from a stop position through an idling speed position to a maximum speed position, a manual control for said mechanical means, an electrically controlled acturator for adjusting said valve through a range from the idling speed position to the maximum speed position, and a manually adjustable electronic governor for controlling said actuator and including an electrical circuit having a switch adapted when closed to render said governor operable, said switch being operable by said manual control and adapted to be closed only when said valve is adjusted to idling speed position by said manual control.

5. In a fuel supply apparatus for a turbo-jet engine, a fuel control valve including a valve stem having a threaded shank, a nut on said shank, a sleeve mounted on said nut and held against axial movement relative thereto but permitting rotation of the nut within said sleeve, manually operable means for bodily shifting said sleeve to adjust the valve stem axially, a rotatably mounted sleeve embracing said nut and secured to said nut for rotation therewith but permitting relative longitudinal movement thereof, a reversible motor for rotating said last-mentioned sleeve, and a governor for controlling said motor.

6. In a fuel supply apparatus for a turbo-jet engine, a fuel control valve including a valve stem, an elongated nut threaded on said stem, a pair of sleeves embracing said nut for adjusting said valve stem axially, said nut being rotatably mounted in one of said sleeves but held against axial movement relative thereto and being secured to the other sleeve for rotation therewith but movable axially relative thereto, manually operable means for bodily shifting said one sleeve axially, a reversible motor for rotating said other sleeve, and a governor for controlling said motor.

7. In a fuel supply apparatus for a turbo-jet engine, a fuel control valve including a valve stem, an elongated nut threaded on said stem, a pair of sleeves embracing the respective ends of said nut for adjusting said valve stem axially, one of said sleeves being secured to said nut against relative axial movement with the nut rotatable therein, and the other of said sleeves having a spline connection with said nut with the nut movable axially therein, a manual control having a rack and pinion connection with said one sleeve, a reversible motor for rotating said other sleeve, and a governor for controlling said motor.

8. In a fuel supply apparatus for a turbo-jet engine, a fuel control valve including a valve stem, an elongated nut threaded on said stem, a pair of sleeves embracing said nut for adjusting said valve stem axially, one of said sleeves being movable axially and the other being movable rotatably with the nut to adjust said valve stem, a manual control for moving said one sleeve axially, an actuator for rotating said other sleeve, and a governor for controlling said actuator.

9. A fuel supply apparatus for a turbo-jet engine having a compressor, comprising a source of fuel under pressure, a pump connected to said source, a metering valve for controlling the flow of fuel from said pump to the combustion chamber of the engine, a by-pass passage connecting the delivery side of said pump with said source, and a valve controlling the flow of fuel through said passage and having an intermediate closed position and movable in opposite directions therefrom to permit flow through said passage, said last-mentioned valve being subjected to the pressure of fuel delivered by said pump tending to move the valve in one direction with the pressure of the metered fuel and the pressure rise through the compressor of the engine tending to move the valve in the opposite direction, whereby the valve is opened in said one direction in response to said pressure rise to control the pressure differential effecting flow through said metering valve and is opened in said opposite direction to permit flow from said source to said metering valve in response to an excessive drop in pressure at the delivery side of said pump.

10. A fuel supply apparatus for a turbo-jet engine having a combustion chamber, comprising a source of fuel under pressure, a pump connected to said source, a metering valve for controlling the flow of fuel from said pump to the combustion chamber of the engine, a by-pass passage connecting the delivery side of said pump with said source, a by-pass valve in said passage slidable in opposite directions to permit flow through said passage, a spring urging said by-pass valve in one direction to open it in response to an excessive drop in pressure of fuel delivered by said pump to permit flow through said passage from said source to said metering valve, and a temperature responsive device including a member engageable by said by-pass valve to limit the movement thereof by said spring, said member being shiftable to open said valve in the opposite direction in response to a critical engine temperature to permit flow through said passage from said pump to said source and thereby reduce the flow through said metering valve.

11. A fuel supply unit for a turbo-jet engine, comprising a first fuel pumping means forming a first source of fuel to deliver fuel under pressure, a housing, a second fuel supply pump mounted in said housing with its intake side adapted to be connected to said first source of fuel, drive means for said first and second pumps, a metering valve mounted in said housing and connected to the delivery side of said second pump for controlling the flow of fuel from said pump to the combustion chamber of the engine, and spring-operated by-pass valve means mounted in said housing and connected to both the intake and delivery sides of said second pump, said housing having passages for subjecting said by-pass valve means to the pressure of the fuel delivered by said pump and the pressure of the metered fuel, said spring means biasing said valve to permit opening of the by-pass valve by its spring in response to an excessive drop in delivery pressure of said pump.

12. A fuel supply unit for a turbo-jet engine having a compressor, comprising a housing having intake and discharge passages respectively adapted to be connected to a source of fuel and to the combustion chamber of the engine and having a metering valve chamber connected to said discharge passage and a by-pass valve chamber connected to said intake passage, a pump mounted in said housing and adapted to be connected to the engine, said pump having its intake side connected to said intake passage and its delivery side to said metering valve chamber and said by-pass valve chamber, a metering valve mounted in said metering valve chamber for controlling the flow of fuel from the pump to the combustion chamber, shiftable by-pass valve means mounted in said by-pass valve chamber and subjected to the pressure of the fuel delivered by said pump, said by-pass valve chamber also having a connection with said discharge passage to subject said valve means to the pressure therein, and an actuator engaging said by-pass valve means and connected for actuation by the pressure rise through the compressor of the engine.

13. A fuel supply unit for a turbo-jet engine having a compressor, comprising a housing having intake and discharge passages respectively adapted to be connected to a source of fuel and to the combustion chamber of the engine and having a metering valve chamber connected to said discharge passage and a by-pass valve chamber, a pump mounted in said housing and adapted to be connected to the engine, said pump having its intake side connected to said intake passage and its delivery side to said metering valve chamber, a metering valve mounted in said metering valve chamber for controlling the flow of fuel from the pump to the combustion chamber, shiftable by-pass valve means mounted in said by-pass valve chamber, said by-pass valve chamber being connected at one end to the discharge side of said pump and at a point intermediate its ends to said intake passage and at its other end to said discharge passage, and an actuator extending into said other end of said by-pass valve chamber and engaging said valve means, said actuator being connected for actuation by the pressure rise through the compressor of the engine.

14. A fuel supply unit for a turbo-jet engine having a compressor, comprising a housing having intake and discharge passages respectively adapted to be connected to a source of fuel and to the combustion chamber of the engine and having a metering valve chamber connected to said discharge passage and a by-pass valve chamber, a pump mounted in said housing and adapted to be connected to the engine, said pump having its intake side connected to said intake passage and its delivery side to said metering valve chamber, a metering valve mounted in said metering valve chamber for controlling the flow of fuel from the pump to the combustion chamber, shiftable by-pass valve means mounted in said by-pass valve chamber, said by-pass valve chamber being connected at one end to the discharge side of said pump and at a point intermediate its ends to said intake passage and at its other end to said discharge passage, and an actuator mounted in said housing and comprising a reciprocable member extending into said other end of said by-pass valve chamber and engaging said valve means, and a diaphragm for actuating said member and adapted to be subjected at one side to the pressure of the ambient air and at its other side to the discharge pressure of the compressor of the engine.

15. In a fuel supply unit for a turbo-jet engine having a compressor, comprising an engine driven pump adapted to be connected to a source of fuel, a metering valve adapted to be connected to the combustion chamber of the engine for controlling the flow of fuel from said pump to the combustion chamber, and a housing enclosing said pump and said metering valve and having an intake passage for connecting the pump with said source and a discharge passage for connecting the metering valve with the combustion chamber, a by-pass valve mounted in a chamber in said housing and comprising valve means reciprocable in said chamber, said chamber being connected at one end to the delivery side of said pump and at its side and adjacent said one end to said intake passage whereby shifting of said valve means establishes by-pass communication between the two sides of said pump, the other end of said chamber being connected to said discharge passage, and an actuator comprising a member for engaging said valve means in said other end of the chamber, said housing having a diaphragm chamber positioned adjacent said other end, and a diaphragm mounted in said diaphragm chamber, the latter being adapted to be connected on one side of said diaphragm to the ambient air and on the other side of said diaphragm to the discharge pressure of the compressor of the engine.

16. In a fuel supply unit for a turbo-jet engine having a compressor and a pump for pumping fuel from a source of fuel under pressure through a metering valve to the combustion chamber of the engine, a by-pass valve comprising means providing a cylindrical valve chamber, a cylindrical valve member slidably mounted in said chamber, the opposite ends of said chamber being connected to the discharge side of said pump and to the discharge side of said metering valve respectively to subject the valve member at its opposite ends to the respective pressures thereof, said chamber being connected at its side to said source with the pressure of said source balanced as to said valve member, an actuating member extending into said chamber, a spring mounted in said chamber, said actuating member and said spring bearing against the end of said valve member subjected to the pressure at the dishcarge side of said metering valve, said means also providing a diaphragm chamber connected at opposite sides to the pressure of the ambient air and to the pressure of air discharged by the compressor of the engine, and a diaphragm in said diaphragm chamber oppositely subjected to said air pressures for actuating said actuating member.

17. A fuel supply unit for a turbo-jet engine having a compressor and a combustion chamber, comprising a housing, a pump mounted in said housing, a pair of valve assemblies mounted in said housing for removal independently of each other, one of said valve assemblies comprising a metering valve for controlling the flow of fuel from said pump to the combustion chamber of the engine, the other assembly comprising a by-pass valve around the pump for controlling the flow of fuel to the metering valve, power drive and manually operable means for adjusting said metering valve detachably secured to said housing, and diaphragm means operable in response to the pressure rise through the compressor of the engine and tending to shift the by-pass valve, said diaphragm means being detachably secured to said housing.

18. In a fuel supply apparatus for a turbo-jet engine comprising a housing enclosing a fuel pump for supplying fuel to the combustion chamber of the engine, a metering valve assembly for regulating the flow of fuel to the combustion chamber, said assembly having a unitary construction for removable mounting in said housing and comprising a valve body adapted to be rigidly secured in said housing and having a pair of chambers respectively connected to the pump and to the combustion chamber and a valve seat between said chambers, a valve member slidably mounted in said valve body and cooperating with said seat to control the flow of fuel therethrough, said valve member projecting at one end beyond said valve body, and power-operated and manually operable means engaging said projecting end of the valve member for adjusting the latter.

19. In a fuel supply apparatus for a turbo-jet engine comprising a housing enclosing a fuel pump for supplying fuel to the combustion chamber of the engine, a metering valve assembly for regulating the flow of fuel to the combustion chamber, said assembly having a unitary construction for removable mounting in said housing and comprising a valve body adapted to be rigidly secured in said housing, a valve member slidably mounted in said valve body for controlling the flow of fuel therethrough and having a stem projecting beyond said valve body and said housing, said valve member being secured to said valve body against rotation relative thereto, a nut threaded on said stem, a power operated drive for rotating said nut to adjust the valve member, and manually operable means for shifting said nut bodily to adjust the valve member.

20. In a fuel supply apparatus for a turbo-jet engine comprising a housing enclosing a fuel pump for supplying fuel to the combustion chamber of the engine, a metering valve assembly for regulating the flow of fuel to the combustion chamber, said assembly having a unitary construction for removable mounting in said housing and comprising a valve body adapted to be rigidly secured in said housing, a valve member slidably mounted in said valve body for controlling the flow of fuel therethrough and having a stem projecting beyond said valve body and said housing, said valve member being secured to said valve body against rotation relative thereto, a nut threaded on said stem, a sleeve having a spline connection with said nut, a reversible motor having a worm drive connection with said sleeve for adjusting said valve member, and a manually operable rack and pinion device connected to said nut for adjusting the valve member.

21. In a fuel supply apparatus for a turbo-jet engine comprising a housing enclosing a fuel pump for supplying fuel to the combustion chamber of the engine, a metering valve assembly for regulating the flow of fuel to the combustion chamber, said assembly having a unitary construction for removable mounting in said housing and comprising a valve body adapted to be rigidly secured in said housing, a valve member slidably mounted in said valve body for controlling the flow of fuel therethrough and having a stem projecting beyond said valve body and said housing, a cover structure enclosing said stem and adapted to be removably secured to said housing, a motor carried by said cover structure and having a driving connection with said stem for adjusting said valve member, and a manually operable rack and pinion device carried by said cover structure and connected to said stem for adjusting said valve member.

22. In a fuel supply apparatus for a turbo-jet engine, a source of fuel, a pump for pumping fuel from said source to the combustion chamber of the engine, a metering valve for controlling the flow from said pump to the combustion chamber, a governor-controlled electric motor for adjusting said valve, and a pair of limit switches operable by said valve and included in the electric motor circuit for opening the motor circuit at predetermined limits of adjustment of said metering valve.

23. A fuel supply apparatus for a turbo-jet engine, comprising a housing, an adjustable fuel metering valve mounted in said housing and accessible at its opposite ends from the exterior of said housing, a governor-controlled electric motor drive assembly carried by said housing adjacent one end of said valve for adjusting said valve, and a limit switch assembly carried by said housing adjacent the other end of said valve and comprising a pair of limit switches respectively operable by the valve at opposite limits of its adjustment for opening the electric circuit of said motor.

24. A fuel supply apparatus for a turbo-jet engine, comprising a housing, an adjustable fuel metering valve mounted in said housing and accessible at its opposite ends from the exterior of said housing, a governor-controlled electric motor drive assembly carried by said housing adjacent one end of said valve for adjusting said valve, and a limit switch assembly detachably secured to said housing adjacent the other end of said valve, and comprising a hollow cover, a pair of limit switches adjustably mounted in said cover and having operating members in engagement with said valve and respectively operable thereby at opposite limits of adjustment of the valve for opening the electric circuit of said motor, and an adjusting member extending through said cover for adjusting the position of said switches.

25. In a fuel supply apparatus for a turbo-jet engine comprising a housing enclosing a pump for pumping fuel from a source of fuel under pressure to the combustion chamber of the engine, a valve assembly for by-passing fuel around said pump and having a unitary construction for removable mounting in said housing and comprising a hollow cylindrical valve body adapted to be rigidly secured in said housing and having one end open for access of fuel from one part of the apparatus and a passage at the other end for access of fuel from another part of the apparatus, said valve body having a transverse opening adjacent said one end for access of fuel from still another part of the apparatus, a cylindrical valve member slidably mounted in said valve body and adapted to be subjected to the fuel pressures in the respective ends of said valve body and being slidable away from said one end to permit flow of fuel from said one end to said transverse opening, a spring mounted in said other end of the valve body and tending to move said valve member toward said one end, an actuating member slidably mounted in said other end of the valve body, a cap mounted on said other end of the valve body and provided with a diaphragm chamber therewith, and a diaphragm located in said chamber and clamped between said cap and said valve body, said cap and said valve body having passages for access to said diaphragm of air under certain pressures.

26. In a fuel supply apparatus for a turbo-jet engine comprising a housing enclosing a pump for pumping fuel from a source of fuel under pressure to the combustion chamber of the engine, a valve assembly for by-passing fuel around said pump, said assembly being adapted to be removably mounted as a unit in said housing and comprising a hollow cylindrical valve body adapted to be inserted in said housing and having one end open and the other end closed, said valve body at the closed end having a flange adapted to be seated against said housing and being provided with a fuel passage extending to the interior of the valve body, a cylindrical valve member slidably mounted in said valve body concentrically therewith, said valve body having a transverse opening adjacent said one end and said valve member having a peripheral groove adjacent said opening, said valve member normally being positioned to prevent communication between said transverse opening and said one end of the valve body, and said valve body when shifted in either direction from its normal position providing such communication, a cap mounted on the closed end of said valve body and providing a diaphragm chamber therewith, a diaphragm mounted between said cap and said valve body and extending across said chamber, and an actuating rod engaged by said diaphragm and extending into said valve body for engaging said valve member.

27. In a fuel supply apparatus for a turbo-jet engine comprising a housing enclosing a pump for pumping fuel from a source of fuel under pressure to the combustion chamber of the engine, a valve assembly for by-passing fuel around said pump, said assembly being adapted to be removably mounted as a unit in said housing and comprising a hollow cylindrical valve body adapted to be inserted in said housing and having one end open and the other end closed, said valve body at the closed end having a flange adapted to be seated against said housing and being provided with a fuel passage extending to the interior of the valve body, said valve body also having a transverse opening adjacent its open end, a cylindrical valve member slidably mounted in said valve body and having a pocket in its end adjacent the open end of the valve body with a transverse opening aligning with the transverse opening in the valve body, and an auxiliary valve mounted in said valve member for closing the end of said pocket, said valve member being shiftable toward the closed end of the body to permit flow of fuel from said open end to said transverse opening in the valve body, and said auxiliary valve being shiftable toward said open end to permit flow of fuel from said transverse openings to said open end.

28. A fuel supply apparatus for a turbo-jet engine having a compressor and a combustion chamber, comprising a source of fuel under pressure, a pump for supplying fuel from said source to the combustion chamber of the engine, a metering valve for regulating the flow of fuel to the combustion chamber, a by-pass valve for controlling the pressure of the fuel delivered by the pump to the metering valve, said by-pass valve providing a connection between the delivery side of said pump and said source and being adapted when open to by-pass a portion of the fuel delivered by the pump back to said source, said by-pass valve being responsive to the pressure rise through said compressor, and an auxiliary valve adapted to open when pressure of fuel from said source exceeds the pressure of fuel delivered by said pump for permitting flow of fuel from said source to said metering valve around said pump.

29. A fuel supply apparatus for a turbo-jet engine having a combustion chamber, comprising a housing having an intake passage adapted to be connected to a source of fuel under pressure and a discharge passage adapted to be connected to the combustion chamber of the engine, a pump in said housing connected to said intake passage, a metering valve for regulating the flow of fuel from said pump to said discharge passage, said housing having a by-pass passage connecting the delivery side of said pump with said intake passage, and a by-pass valve in said by-pass passage adapted when open to by-pass a portion of the fuel delivered by said pump back to said intake passage, said by-pass valve carrying an auxiliary valve subjected to the pressure of the fuel delivered by said pump and the pressure of the fuel in said intake passage and adapted to open when the second-mentioned pressure exceeds the first-mentioned pressure to permit flow around said pump and through said by-pass passage from said intake passage to said metering valve.

References Cited in the file of this patent

UNITED STATES PATENTS

| Number | Name | Date |
|---|---|---|
| 1,483,536 | Warren | Feb. 12, 1924 |
| 1,510,688 | La Fon | Oct. 7, 1924 |
| 2,078,956 | Lysholm | May 4, 1937 |
| 2,136,959 | Winfield | Nov. 15, 1938 |
| 2,219,994 | Jung | Oct. 29, 1940 |
| 2,299,635 | MacNeil | Oct. 20, 1942 |
| 2,330,558 | Curtis | Sept. 28, 1943 |
| 2,404,428 | Bradbury | July 23, 1946 |
| 2,405,888 | Holley | Aug. 13, 1946 |
| 2,422,808 | Stokes | June 24, 1947 |
| 2,438,663 | Greenland | Mar. 30, 1948 |
| 2,446,523 | Bradbury | Aug. 10, 1948 |
| 2,531,780 | Mock | Nov. 28, 1950 |

FOREIGN PATENTS

| Number | Country | Date |
|---|---|---|
| 606,613 | France | Mar. 12, 1926 |